Patented Mar. 6, 1934

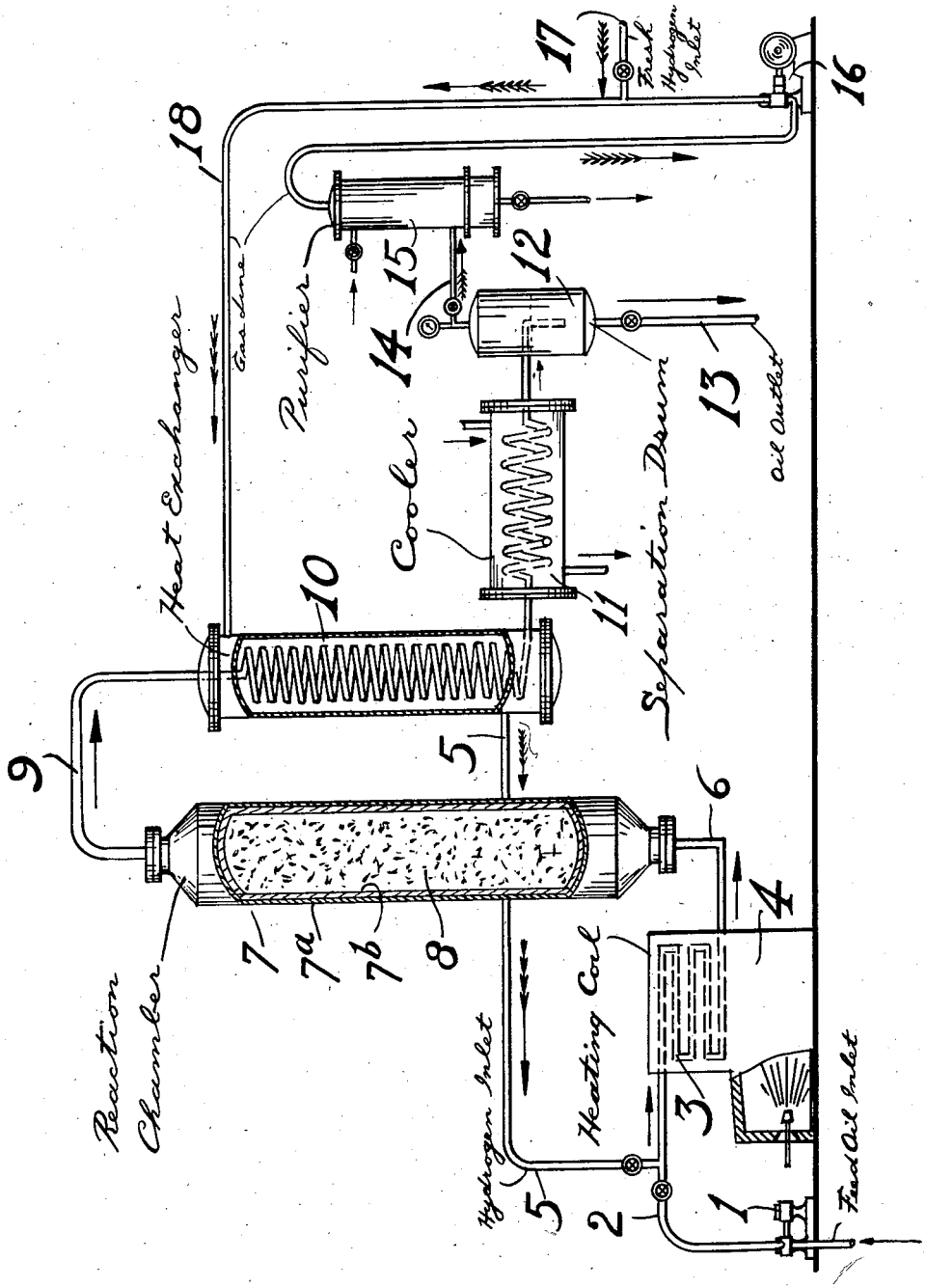

1,949,631

UNITED STATES PATENT OFFICE 1,949,631

METHOD FOR CONDUCTING HIGH TEMPERATURE HYDROGENATION PROCESSES

Robert P. Russell, Elizabeth, N. J., assignor to Standard-I. G. Company

Application July 26, 1930, Serial No. 471,104

1 Claim. (Cl. 196—53)

The present invention relates to an improved method for conducting high temperature hydrogenation processes for the treatment of hydrocarbon oils and refers especially to the use of certain steel alloys for the hot portions of the apparatus. My process will be fully understood from the following description.

In processes for the destructive hydrogenation of hydrocarbon oils at high temperatures to produce low boiling oils of an unsaturated or aromatic character, difficulty is experienced in obtaining metals for the apparatus which will withstand the severe conditions of temperatures and pressure which are necessary. I have now found that certain alloys, which I will disclose below, are admirably adapted for this service. Not only do these alloys possess greater strength but they are also more resistant to the corrosive effect of the reactants.

In the operation of my process, hydrocarbon oils such as reduced crudes, and preferably gas oil, kerosene, heavy naphtha and low grade stocks, such as refractory materials obtained from cracking operations, are forced with hydrogen through a heated coil whereby the temperature of the mixture is raised to about 850° to 950° F. or higher. The heated mixture is then discharged into and through a catalytic reaction zone packed with a catalyst which will be specifically disclosed below. The temperature of the catalytic reactor is maintained above about 930° F., and is preferably between about 950° and 1050° F. It has been found that no heat need ordinarily be added to the reactor other than that which is carried in with the feed, since the heat of the reaction is sufficient to maintain the reaction temperature in the catalytic reactor which is insulated.

The heating coil and reaction zone are maintained under high pressure, the total pressure being in excess of 50 atmospheres and preferably from 150 to 300 atmospheres, although it may be higher. When operating to produce anti-detonating motor fuel, hydrogen pressure is most advantageous between the limits of 3 to 5 times the oil pressure, which ordinarily should not exceed about 75 atmospheres and is preferably from 40 to 60 atmospheres for best results when the maximum total pressure does not exceed 300 atmospheres. When this is in excess of 300 atmospheres the oil partial pressure may be proportioned accordingly. If a more saturated product is desired the partial pressure of the oil may be much lower, as will be understood. The rate of flow of the oil is preferably in excess of about 1 volume per volume of reactor space per hour and the most desirable range is in excess of 2 volumes per volume per hour. It will be understood that the amount of hydrogen circulated is sufficient to maintain partial pressure conditions as indicated above.

As catalysts I prefer to use the oxides and/or sulfides of chromium, tungsten, molybdenum, and the like, or other compounds or mixtures of these materials with each other or with other materials such as alkaline earth compounds, zinc oxide or magnesia. I may also use the selenides and tellurides of heavy metals such as those of the sixth group of the periodic system. These latter may be used either alone or in mixtures with each other or with other compounds such as those previously stated. The catalyst may be made up in paste and allowed to dry into cubes or other shapes, or may be supported on convenient carrying materials particularly those capable of readily conducting away heat. For this purpose shavings or turnings of copper, nickel, or high chromium and nickel alloys are particularly desirable, since they exert catalytic influence in addition to their heat dissipating capacity. Other metallic substances possessing no detrimental catalytic influence may also be employed.

Ordinarily it has been found impossible to operate under the conditions of high temperature and pressure such as described above without great danger of metal failure when the apparatus is constructed of the usual steels or steel alloys. If these ordinary materials are used, they may be at best employed for only short periods of time, owing to the rapidity with which they are attacked when exposed to the reactants in the hot portions of the apparatus. I have now found that steel alloys containing more than 20% chromium and nickel in excess of 10% are especially suitable for this purpose, and that their use permits operation at temperatures and pressures heretofore unattainable. In order to obtain good resistance against sulfur-corrosion it is preferable to employ a higher percentage of free chromium than nickel in the alloy. The carbon content of the alloy should be below about 0.50% or even 0.10% for best results, and it may contain small percentages of other materials such as silicon, molybdenum, tungsten, manganese, copper, vanadium and the like. For example, an alloy of the following composition has been found satisfactory: 27% chromium, 22% nickel, 2% silicon, 0.2% carbon, with the remainder iron.

By employment of my preferred alloys much greater resistance to oxidation is secured than with ordinary steel alloys or even than with steel alloys containing as much as 18% chromium and 8% nickel, thus permitting use as tubes at higher temperatures in direct-fired furnaces. Not only are my alloys possessed of greater tensile strength but when stressed to the point of failure they tend to distort slowly rather than yield suddenly, as is the case with alloys containing less chromium and nickel under the conditions of my process. This is explained by the fact that with my alloys the point of minimum ductility is at a temperature above the desired operating temperature, while with the lower chromium and nickel alloys this point occurs in the operating range. The alloys which I have disclosed are more uniform when shaped into tubes and less subject to irregularities since in their heat treatment they are cooled slowly in air rather than quenched in water or oil. For this reason they are also subject to no initial internal stress as a result of rapid cooling and therefore possess a greater effective strength. Furthermore, after prolonged service at high temperature they tend to corrode to a lesser degree on exposure to moist air and dilute acids than do lower chromium and nickel alloys.

The reaction vessel in the process as described may be constructed wholly of alloys of the type mentioned or may merely be lined with them in order to offer a resistant surface to the reacting materials. Because of their great strength at high temperatures and their resistance to attack these alloys may be used in the construction of the tubes in the heating coil and other hot lines. As in the case of the reaction vessel, the tubes may be lined with the alloy, but ordinarily I prefer to construct the whole tube thereof. A further advantage of alloys of the type mentioned is that they not only exert no detrimental catalytic effect as is the case with ordinary steels, but to the contrary act catalytically to a certain extent to favor the hydrogenation reaction.

I have found that when operating in the manner disclosed above operation may be conducted for long periods of time to produce motor fuel of extremely high anti-detonation quality. This is made possible by the employment of my alloys which permit continued operation at the high temperatures necessary for the production of highly knock-suppressing motor fuel such as I obtain. These fuels are generally superior in anti-knock value to the fuel produced by addition of as much as 50% benzol to a gasoline from an ordinary sweet crude. It will be understood that oils of this type may be produced when lower chromium-nickel alloys are employed, for example those containing 18% chromium and 8% nickel, but as mentioned, the operation may be conducted for only short periods of time and with considerable danger of metal failure. In operating on a gas oil distillate it is possible to produce over 75 or 85% of oil boiling below 400° F. It is generally desirable to separate the products obtained from the hydrogenation reactor into fractions boiling below 400° F. or 430° F. suitable for motor fuel, and fractions boiling thereabove. This latter fraction is preferably recirculated through the coil and reactor to increase the yield of low boiling products. Because of their extreme anti-knock value the oils produced by my process are excellent anti-knock blending stocks for motor fuel.

To illustrate the type of equipment which may be used in the hydrogenation of hydrocarbon oils, reference is made to the drawing in which numeral 1 denotes a feed pump which forces the oil through a line 2 and a heating coil 3 arranged in a furnace setting 4. Hydrogen gas is admitted to the inlet of the coil by means of a pipe 5 and the heated mixture flows through a pipe 6 into a reaction chamber 7. This chamber is preferably made of an ordinary steel shell 7a with a lining 7b consisting of a high chromium, high nickel alloy, and it is preferably filled with a suitable catalytic material indicated at 8.

The products of reaction are discharged from the reaction chamber through a pipe 9 which is in communication with the heat exchanger 10, cooler 11 and a separation drum 12, from which the oil flows to storage by pipe 13 and the gas is drawn off by pipe 14. The gas may be purified in any convenient manner, as indicated at 15, which may be a scrubbing tower adapted for washing the gas with oil to remove gaseous hydrocarbons. The purified gas is compressed by a booster pump 16 and forced along with fresh hydrogen which has been introduced at pipe 17 through a pipe 18, exchanger 19 and into pipe 5 for recirculation.

The entire equipment may be constructed of the alloys described above, but this is not absolutely necessary. The coil 3 is preferably constructed of these materials, at least that portion of the coil in which the oil reaches a temperature above 900° F. The reaction chamber and the lines associated with it may also be made entirely of the preferred alloys but for reasons of economy it is preferred to construct the reaction chamber of an outer wall of ordinary steel which is not in contact with the reactants to stand the pressure, and the outer shell is fitted with a lining made of the preferred alloy. The heat exchanger tubes need not be made of the particular alloy, although it is satisfactory for that purpose.

My invention is not to be limited by any theory of the mechanism of the process nor to any specific example which may have been given for purpose of illustration, but only by the following claim in which I wish to claim all novelty inherent in my invention.

I claim:

In a process for preparing low boiling hydrocarbons suitable for motor fuel from higher boiling hydrocarbons which comprises subjecting the higher boiling hydrocarbons to the action of free hydrogen at temperatures in excess of 900° F. and under pressures above 100 atmospheres, the improvement which comprises subjecting the materials to treatment in a reaction vessel at least the inner surface of which is constructed of an iron alloy containing about 27% chromium, 22% nickel, not more than 2% silicon and less than 0.5% carbon.

ROBERT P. RUSSELL.